Sept. 28, 1954 K. G. ÅHLÉN 2,690,054
HYDRODYNAMIC TORQUE CONVERTER
Filed March 15, 1950 3 Sheets-Sheet 1
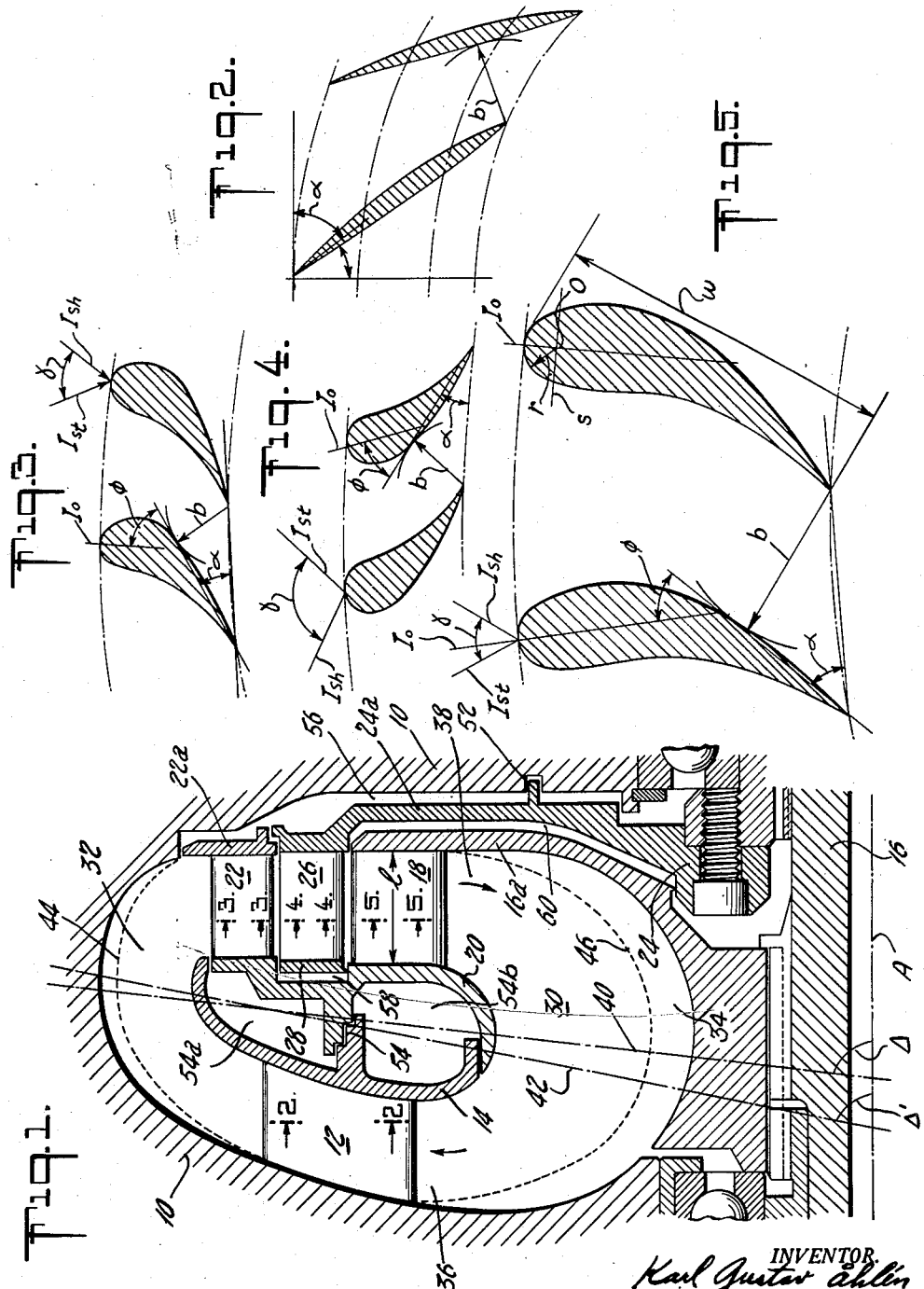
INVENTOR.
Karl Gustav Åhlén
BY
his ATTORNEY

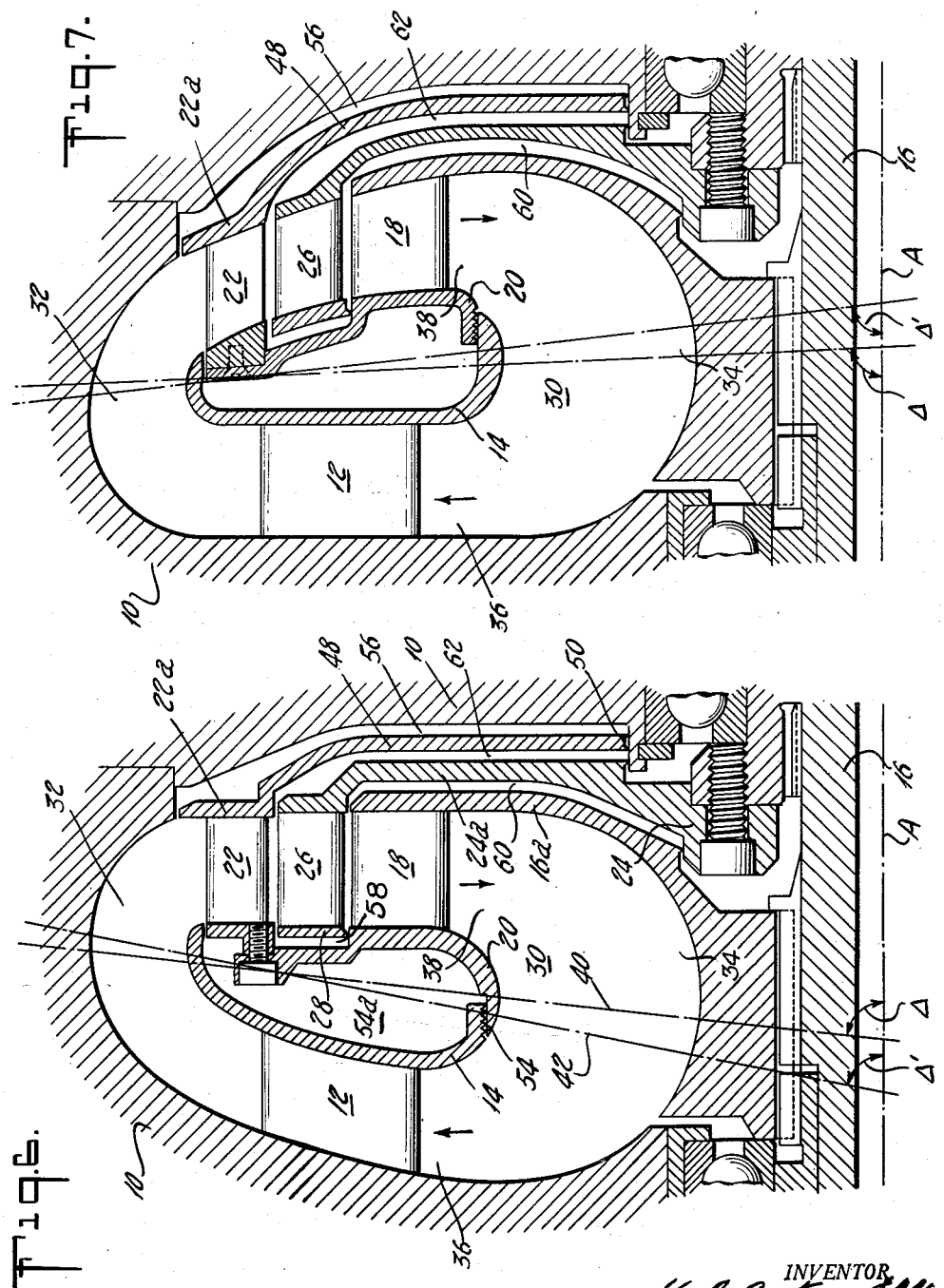

Patented Sept. 28, 1954

2,690,054

UNITED STATES PATENT OFFICE 2,690,054

HYDRODYNAMIC TORQUE CONVERTER

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application March 15, 1950, Serial No. 149,777

13 Claims. (Cl. 60—54)

The present invention relates to hydrodynamic torque converters, more particularly to such converters of the rotating casing type and still more particularly to such converters having two stages of turbine blading.

It is charactertistic of hydrodynamic torque converters that the extent to which the input torque is increased or multiplied by the converter is greatest at stall condition, that is, with the primary or impeller member operating and with the secondary or turbine member standing still. As the speed ($n_2$) of the secondary member rises from zero relative to the speed ($n_1$) of the primary member, the torque multiplication, usually referred to as the torque ratio, decreases, and at some value of the ratio $n_2/n_1$ less than unity, the value of the output torque falls to that of the input torque. When this point, commonly referred to as the shift point, is reached the apparatus no longer functions as a torque multiplying device and if the speed of the secondary member is increased to produce a higher value of $n_2/n_1$ than that at the shift point, the output torque falls to a value less than that of the input torque, so that the apparatus has no utility. Thus the useful range of the apparatus is between stall and shift point. It is a further characteristic of converters of the kind under consideration that the efficiency of the apparatus over the useful range is very similar to that of a variable speed turbine, rising from zero value at stall to a peak value at some intermediate value of the speed ratio $n_2/n_1$ and falling from the peak value to a lower value at the shift point. At the shift point the values of the efficiency and the speed ratio $n_2/n_1$ are equal.

Hydrodynamic torque converters have been used for a number of years as transmission units to produce tractive effort for the propulsion of vehicles and more recently have been applied to automotive drives in the passenger car field.

For these drives it is desirable to provide a high stall torque ratio, high peak efficiency with as little decrease from peak efficiency as possible over the useful speed range, and as wide a useful speed range as possible, that is, with the shift point at as high a value of $n_2/n_1$ as it is possible to obtain. As to the latter factor, a shift point value of $n_2/n_1$ equal to unity is the most desirable, but that is impossible of attainment because of the inherent characteristics of the device. One or more of the desired performance characteristics can be more or less readily secured by converters of known design, but to secure high performance values for all the desired characteristics is an extremely difficult problem since design features which will give a particularly good value for one characteristic will adversely affect another. As an example, very high stall torque ratios are obtainable by using three or more stages of turbine blading but with that number of stages it is practically impossible to obtain a shift point ratio of $n_2/n_1$ as high as is necessary to meet the needs of all desired application of the converter. Also, in automotive applications, particularly in the passenger car field, considerations of weight, space and cost are extremely important, while at the same time the specifications for required stall torque ratio, locale of shift point and overall efficiency are relatively severe. The result is that so far as I am aware, no converter has heretofore been designed which adequately alone meets the needs of the passenger field, such converters invariably requiring to be combined with at least a two-speed mechanical gear in order to provide a transmission adequately meeting the required specification.

It is therefore the general object of the present invention to provide a new and improved form of torque converter embodying various novel features of construction in the hydraulic circuit which will result in such improvement in operating characteristics as to enable the converter to be applied in cases where heretofore more complex and expensive types have been required, and which will among other things meet the requirements of the automotive field without the use of auxiliary gearing in many cases where such gearing is required with present converters. A further object is to provide such an improved converter which is of relatively simple and low cost construction. Other and more detailed objects and advantages will appear as this description proceeds.

In order to attain the several objects and advantages, the invention contemplates the provision of a converter of the rotating casing type which for most applications, and particularly automotive transmission installations, requires not more than two turbine stages, and in which the form of the hydraulic circuit and the form and arrangement of the reaction or guide blades and the turbine blades are in accordance with novel principles resulting in performance characteristics providing a high stall torque ratio, high peak efficiency with a flat efficiency curve characteristic over a relative wide range of speed ratios $n_2/n_1$, and a high value of $n_2/n_1$ at the shift point. The invention in certain of its aspects also contemplates improved construction whereby the major parts may be arranged so that not only are the hydraulic characteristics improved but structural advantages such as better balancing against axial thrust and better seal arrangements are provided.

The manner in which the several objects are attained may best be understood from consideration of the ensuing portion of this specification, taken in conjunction with the accompanying drawings, which disclose by way of example but without limitation, several embodiments of apparatus suitable for carrying out the principles of the invention.

In the drawings:

Fig. 1 is a more or less diagrammatic longitudinal half section of a converter embodying the invention.

Figs. 2 to 5 are sections taken on the respectively numbered section lines of Fig. 1; and Figs. 6, 7 and 8 are views similar to Fig. 1 showing other forms of converter embodying the invention.

Figure 8:
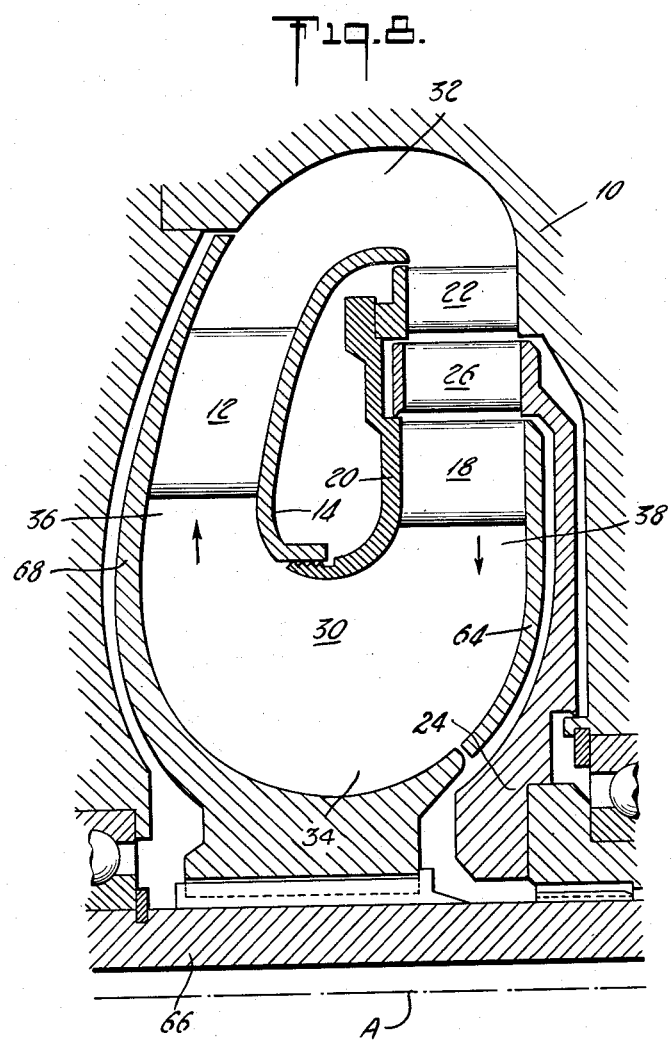

Referring now to Fig. 1 and related figures, the converter illustrated is of the rotating casing 2-stage type. The rotatable casing 10 constituting the primary member, the axis of rotation of which is indicated at A, carries a ring of impeller or pump blades 12 connected by an inner core ring element 14. The rotatably mounted secondary or turbine member 16 carries the ring of second stage turbine blades 18, the inner ends of which support the core element 20, which in turn supports the ring of first stage turbine blades 22. The reaction member 24 may be fixed against rotation in either direction at all times, it may be mounted for rotation in either direction under certain conditions, and in the case of so-called double rotation converters it may be arranged to deliver power when acting as a moving reaction member rotating in a direction opposite that of the impeller. Member 24 carries the ring of reaction guide blades 26, the blades being connected at their inner ends by the ring element 28.

From the drawing, it will be seen that the core forming the inner perimeter of the cross section of the circuit or path of flow 30 for the working fluid, is formed by elements 14, 20 and 28. The outer perimeter of the section of the circuit is formed by the casing 10, the turbine member 16, and a part of the reaction member 24.

From Fig. 1, several characteristics of the contour of the circuit are to be noted, since they are of importance in attaining the results sought. As will be observed, the circuit comprises two portions 32 and 34, at the radially outer and radially inner parts of the circuit respectively, in which the direction of flow of the working fluid is substantially reversed and it will further be observed that these portions which may conveniently be referred to as reverse bend sections of the circuit, are sections providing for free flow of the working fluid owing to the absence of any blading in these sections.

The sections 32 and 34 connect an outflow or centrifugal section 36 and an inflow or centripetal section 38, and as will be seen from the figure, only the impeller blades are located in the former while all of the guide and turbine blading is located in the latter for centripetal flow of the fluid past the blades. This disposition of the blading with reference to centrifugal and centripetal flow is important to the securing of the desired results.

Further, it will be noted that the centripetal section 38 is radial with respect to the axis of rotation, while the centrifugal section 36 is inclined. As will hereinafter appear this relation may be reversed, but the inclination of one or the other of the sections under consideration is important for reasons later explained. The above described arrangement of the several sections of the circuit results in a characteristic shape of circuit the cross section of which is defined at its inner boundary by a core of generally pear shaped cross section and at its outer boundary by wall structure forming a cavity of similar pear shaped cross section. The cross sections of both the core and the cavity may further be defined geometrically by the fact that the neutral axes of both of the sections, that is, the lines passing through the centers of gravity about the axes with respect to which the sections have minimum moments of inertia, are both inclined in the plane of the sections with respect to the axis of rotation A. In Fig. 1 the neutral axis of the cross section of the core, hereinafter referred to for brevity as the neutral axis of the core, is indicated at 40 and makes an acute angle $\Delta$ with the axis of rotation A, while the comparable axis of the cross section of the cavity, hereinafter referred to as the neutral axis of the cavity, is indicated at 42 and makes a more acute angle $\Delta'$ with the axis A.

It is further to be noted that the return bend sections of the circuit are formed so that the flow area in each of the sections first increases and then decreases in the direction of flow of the fluid, this form of channel differing from conventional practice providing substantially constant flow area as indicated by dotted lines 44 and 46.

Referring now more particularly to Figs. 2 to 5, illustrative of blading embodying certain of the novel features of the invention, $\alpha$ indicates the outlet or discharge angles of the several blades, and $b$ the minimum distance between adjacent blades of the same ring, or, in other words, the narrowest or throat portion of the flow channel between the blades.

In Figs. 3 to 5 the relative inlet angle of the fluid entering the guide and the turbine blade rings at stall, that is, with the impeller turning at a normal speed and the turbine stationary, is indicated by the arrows $I_{st}$, while arrows $I_{sh}$ indicate the direction of the relative inlet velocity at the shift point. The angle of divergence between these two conditions which mark the limits of the useful range of the converter, is denoted by $\gamma$.

By comparing Figs. 3, 4 and 5 it will be observed that the angle of divergence $\gamma$ in the case of the guide blades is materially greater than in the cases of both stages of turbine blades. The greater deviation of the relative inlet angle from the optimum angle (represented by $I_0$) in the case of the guide blades, which is characteristic of converters of the kind under consideration that are properly designed to meet the several required conditions, results in increased losses on both sides of the peak efficiency point being incurred more rapidly at the guide blade ring than at the turbine rings if the converter is equipped with blades of the same general type of profile and this factor tends to lower both the value of the stall torque ratio obtainable and the value of the speed ratio $n_2/n_1$ at the shift point. It is the case for all blades in the circuit that the relative inlet angle will deviate, with changes in the speed ratio $n_2/n_1$ from the optimum direction $I_0$ productive of minimum inlet losses, and in order to reduce losses in all blade rings due to such deviation it is preferable to use blades having profiles characterized by inlet edge portions which are bluntly rounded. The profiles are further shaped with remaining portions which with the inlet edge portions provide curved flow channels which serve to laterally deflect the fluid traversing the channels and also accelerate its rate of flow, since the flow area of the channels decreases, first relatively rapidly and thereafter more gradually, from the inlets to the throats $b$ at the outlets.

The general type of blade profile and channel just described is not broadly new but in accordance with certain aspects of this invention the nature of these profiles and channels are changed as compared with prior practice in order to secure the improved results which are obtained.

In accordance with one of these aspects the inlet edge portions of the guide blade profiles are made relatively more blunt than those of the turbine blades and since the blade profiles are of gradually changing curvature it is necessary in the interest of clarity to define the inlet edge portions of the profiles and their nature in the terms hereinafter employed in this description and the appended claims. In general, the inlet edge portions are arcuate in form and may be an exact arc of given radius. On the other hand, these portions may deviate from exact circular arcs while still retaining generally or approximate circular form of radius $r$ with respect to a center $o$ as illustrated in Fig. 5. It will therefore be understood that as hereinafter employed the term radius, as applied to the inlet edge portions of the blade profiles is to be understood as defining profiles having approximately circular inlet edge portions as well as those of exact circular form. Also, the inlet edge portions will be understood as those portions on the inlet side of a line $s$ drawn perpendicularly to the direction of optimum relative inlet flow $Io$ at the center $o$, as is also shown in Fig. 5. Further, for purposes of explanation and definition, the width of the blades will be considered as the distance $w$ (Fig. 5) from the inlet to the outlet edges the length $l$ of the blades being indicated on Fig. 1.

As previously noted, the inlet edge portions of the guide blades are more bluntly rounded in accordance with one feature of the invention than are the turbine blades, and it has been found that in a given circuit, other conditions being equal, even a small change in the relative bluntness of the blades has a favorable effect. However, in order to secure to the fullest extent the advantages to be derived from this change, I have found that the differences in blade profile employed should be kept within relatively well defined limits which can conveniently be expressed in terms of the values of the ratios of the radii $r$ of the blades to the width $w$ of the blades, i. e. $r/w$.

Because of the latitude possible in the design of the impeller, the value of the angle of divergence $\gamma$ at the inlet of the first stage turbine ring may in some instances be made relatively small and consequently the first stage turbine blades may in such cases be made with relatively sharp inlets. I have found however, that for any acceptable impeller design, that the maximum value for the ratio $r/w$ of the first stage turbine blades is approximately 0.135, since if this value is appreciably exceeded, the peak efficiency is adversely affected. The possible variation in the value of $\gamma$ at the guide blade inlet, with variations in specific design and arrangement of the first stage turbine blades is not so great as at the first stage turbine inlet, but the variations that may be encountered in different designs permit a certain range of values to be used for the ratio $r/w$ of the guide blades, such range, however, being limited to a minimum of approximately 0.120 and a maximum of approximately 0.160. If the maximum is exceeded appreciably, the adverse effect on peak efficiency becomes too great, and if at least substantially the minimum is not used, the advantages sought by the present invention are not fully attained.

The variation in the width of the second stage turbine blades as between different designs is such that the value of $r/w$ for these blades in some instances may be quite low, as for example in a turbine wherein very wide last stage blades are used in order to obtain certain desired input torque absorbing characteristics, but as in the cases of the other blades, I have found that certain limitations apply and that in the case of second stage turbine blades the value of $r/w$ should not exceed aproximately 0.125 if adverse effect on efficiency is to be avoided.

With the above limits in mind, the relation between the values of the ratios $r/w$ of the different blade rings desirable to achieve the best results are to be considered. In general it may be said that these values vary together in the same sense as between different designs, that is, if more bluntly rounded blades are called for in one design than in another, for a given blade ring, the same is generally true for the other rings. In addition, in order to secure best results, the guide blade inlets must be materially more blunt than those of the turbine blade inlets and I have found that in order to fully realize the potential advantages available the profiles of the guide blades advantageously have a ratio $r/w$ the value of which is at least 20% greater than the value of the comparable ratios of the turbine blades. As has previously been noted, the first stage turbine blades may have a value of as high as 0.135 for the ratio $r/w$, while the lower limit of the range of permissible values for the ratio $r/w$ for the guide blades is approximately 0.120, but it will be understood that the maximum value for the former will not be used with the minimum value for the latter and that a difference of the order of at least 20% greater value for the ratio $r/w$ for the guide blades will be adhered to. This applies also to the relation of the ratio $r/w$ for the guide blades to the comparable ratio of a succeeding or second stage ring of turbine blades.

If we now consider the effect of the relatively more blunt guide blade inlets it will be found that when the relative inlet flow is along the optimum direction $Io$, a slightly increased loss is incurred. This loss affects only the peak efficiency value, and it is important to note that the increased loss is incurred only at the guide blade inlet, and does not affect the losses at the inlets of the turbine blades. Thus the reduction in peak efficiency is relatively minor. On the other hand, the relatively more blunt inlets for the guide blades will accommodate with less loss than would otherwise be the case, the deviations in the direction of inlet flow from the optimum direction and also will accommodate without undue increase in inlet loss a much greater deviation of the inlet flow from the optimum direction than would otherwise be the case. Thus, as to the guide blade ring, a slight loss at optimum flow conditions is compensated for by relatively improved performance over the remainder of the useful range of speed ratios. A most important factor, however, is that at other than the optimum point, decrease in the losses resulting from the more blunt guide blades is reflected in a relatively increased rate of flow (quantity per unit time), of the working fluid. This increased rate of flow is obtained not only through the guide blade ring but also through the turbine blade rings, and the effect of the increased rate of flow favorably affects the relative inlet angle of flow to the turbine blades with consequent increase in efficiency of the turbine blades. Thus, by following the principles discussed above a slightly increased loss at one blade ring in the circuit under optimum conditions is more than compensated for by decreased losses at a plurality of blade rings in the circuit under all other conditions over the entire operating range.

For a given primary torque absorbing capacity, the rate of rise of the portion of the efficiency curve under consideration is largely dependent upon the rate of circulation, greater increase in the circulation rate from that obtaining at the peak efficiency point, as stall conditions are approached, resulting in steeper rise of the curve and increased stall torque ratio. I have found that the rate of increase of the circulation rate is dependent to a substantial extent on the inlet conditions of the impeller and further that these conditions may be materially improved so that the rate of circulation at and near stall is increased, by proper selection and correlation of the blade profiles to produce flow channels having certain deflection characteristics as well as contracting flow areas. Many known factors which need not be discussed herein in detail influence the exact design in different cases, but in general in accordance with the present aspect of the invention I employ a turbine blade ring discharging to the impeller in which the blades are as "open" as good design permit, i. e. blades arranged with a relatively large outlet angle $\alpha$ (for example 45°) and correlate the form and arrangement of the preceding rings of blades to produce flow channels having, in combination, novel characteristics productive of improved results when used in conjunction with such a ring of open blades.

In order best to understand the factors involved and the manner in which they are applied and correlated, reference is again had to Figs. 3 to 5, in which the angle $\phi$, being the angle between the line determinative of the outlet angle of the blade and the line $I_0$ representing the direction of optimum inlet flow to the blade, is used to designate the angle of deflection of the flow channels formed between adjacent blades. The angles $\phi$ for the channels of the different rings and the relation between the angles $\phi$ for the different rings are, I have found, of major importance and in order to secure the desired improved results these angles advantageously lie within certain ranges and with certain relationships which are indicated by the following tabulation

| Blade Ring | Min., degrees | Max. degrees |
| --- | --- | --- |
| 1st Turbine Stage | 50 | 90 |
| Guide | 25 | 50 |
| 2nd Turbine Stage | 40 | 65 |

From the foregoing tabulation it will be observed that the angle of deflection for the guide blades is within a range of values lower than the ranges for both stages of turbine blades, and that the angle $\phi$ for the second turbine stage is within a range lower than that for the first turbine stage. It will further be noted that with the ranges given above, the maximum value of the guide blade angle is slightly greater than the minimum value of the second stage turbine blade angle, so that the ranges slightly overlap. However, with variations in design the angles $\phi$ for the several blade rings vary in like manner, so that the minimum value of $\phi$ for one ring will not be used with the maximum value of $\phi$ for another. Consequently, the deflection angle for the guide blade ring will be less than the values for the turbine blade rings and the angle for the second stage turbine blade ring will be less than that for the first stage turbine blade ring, in each individual case.

These relationships are at variance with usual prior practice and result in several advantages favorably affecting the performance of the converter both as to efficiency and as to the location of the shift point with reference to the speed ratio $n_2/n_1$.

In the case both of the first stage turbine blades and the guide blades the outlet angles $\alpha$ are considerably smaller than for the relatively open second stage turbine blades, a suitable outlet angle for these blades being 25°, while for the guide blades a suitable outlet angle is 35°.

With outlet angles and deflection angles of the nature described, substantially more energy is absorbed from the fluid by the first turbine stage than by the second turbine stage and this contributes to increased efficiency due to the fact that the larger portion of the energy is absorbed directly from the discharge of the impeller where flow conditions are best because of lack of disturbance from a preceding blade ring.

Also, as will be seen from Fig. 5, as the ratio $n_2/n_1$ approaches the shift point the direction of relative inlet flow to the second stage turbine channels approaches the direction of outlet flow from these channels This is much more the case with the second stage turbine blades than with the first stage blades, so that as the shift point is approached the first stage turbine blades absorb an increasingly greater percentage of the available energy, the second stage blades becoming progressively more in the nature of guide blades for properly directing flow to the pump inlet. These factors contribute to the maintenance of high efficiency in the portion of the speed range of $n_2/n_1$ above the peak efficiency point and consequently tend to raise the value of $n_2/n_1$ where the shift point occurs.

As will be appreciated by those skilled in the art, the various factors of blade profile, outlet angles, flow deflection etc., all influence each other and it will therefore be understood that only general rules of guidance for laying out a blade system to meet a specific performance requirement can be made. However, from actual test experience I have found that by following the principles above discussed and maintaining the several design factors within the limits stated the desired improved results are obtainable. Obviously, variations in other factors not discussed herein in detail, such for example as specific outlet angles, may be made, but the nature and extent to which such variations may be made to provide a suitable system embodying the principles of this invention are known and well within the capabilities of the skilled designer.

Reverting again to Fig. 1 and the form of the circuit and blade layout, several factors of the design shown contribute to improved circulation rate and reduction in losses that are reflected in higher efficiencies on both sides of the peak efficiency point. By arranging the turbine and guide blading in the centripetal flow section and utilizing a rotating casing, friction loss in this portion of the circuit is minimized and the designer is also given great latitude with respect to the radial extent of the impeller blades, the greater the radial distance of the outlet edges of the impeller blades from the axis A, the greater is the specific torque obtainable from the converter. By specific torque is meant the torque transmitting capacity of a converter of given size. In some instances the impeller blades will have greater radial extent than shown in the examples, to obtain high specific torque, and to that extent the length of the free flow section 32 of the circuit will be reduced, but it is to be noted that the higher the specific torque the less is the maximum stall torque ratio obtainable.

At the outer elbow or return bend section 32 of the circuit there is a major change in direction of the working fluid which entails what may be termed alteration losses. At this section of the circuit the absolute velocity and energy content of the fluid is the greatest, so that it is particularly desirable to minimize the losses in this section. This is accomplished with the present form of circuit, which not only reduces to minimum practical value the length of the section between the impeller outlet and first stage turbine inlet, but also requires a directional change for the high velocity fluid of less than 180° in all cases. When, in addition, the discharge portion of the section 32 is shaped to provide a channel first of expanding flow area and then of contracting flow area, the alteration losses are further reduced. The same factors apply with respect to the return bend section 34, it being noted that the greater length of the section and the greater angle of turn involved are of less importance at this place where the velocity and energy content of the fluid has been reduced to the least of any place in the circuit. The difference between the conditions in sections 32 and 34 is such that in no case should the radial inflow and outflow sections 36 and 38 diverge in radially outward direction, but should on the other hand converge in such direction.

In addition to the improvements in performance obtainable through the use of the features which have been described, converters constructed in accordance with the principles of the invention are readily adapted to the inclusion of other features which further contribute to better hydraulic efficiency and also to more advantageous mechanical characteristics and operation, and in Fig. 6, there is illustrated another embodiment of converter incorporating such an additional feature. In most respects the structure is like that of the embodiment of Fig. 1, and like parts have been designated by like reference characters. In the present construction the turbine member differs from that shown in Fig. 1 by being extended to substantially embrace the portion of the guide blade member exposed to the pressure of the working fluid, this being accomplished by providing the disc like extension 48 extending radially inwardly from the first stage turbine ring 22a between the disc portion 24a of the guide member 24 and the adjacent wall of the casing 10 to a labyrinth type seal 50 of smaller radius than the comparable seal 52 between the guide member and the casing shown in Fig. 1. Also, the seal 54 between the pump and turbine core elements 14 and 20 is located at the radially inner part of the core rather than at the larger radius employed in the construction of Fig. 1.

For many well known reasons, including leakage losses which affect hydraulic efficiency, it is desirable to have seals of as small diameter as possible and the reasons why the present construction permits small diameter seals to be used may be briefly explained by comparing Figs. 1 and 6, bearing in mind the fact that substantial fluid pressures are exerted axially on the several members and that it is highly desirable to balance such pressures to the greatest possible extent. If we now consider Fig. 1, it will be seen that the turbine member is subjected in one direction to high pressure fluid from the impeller only on the outside of the first stage turbine ring 22a the remainder of the pressure or thrust in the same direction being exerted by the fluid at relatively lower pressure between the disc portions 16a and 24a of the turbine and guide members. The thrust exerted over these areas is opposed by fluid pressure from within the core ring acting on element 20, and in order to secure proper balance, the seal 54 is placed at a radially intermediate place in the core, whereby to form a high pressure chamber 54a and a low pressure chamber 54b.

If we now consider Fig. 6 it will be evident that the space 56 extending inwardly to the seal 50 is under relatively high pressure, thus enabling the seal 54 to be moved inwardly so that the high pressure core chamber 54a includes the whole interior of the core.

In the construction of Fig. 1 the guide disc 24a is subjected to relatively high pressure from the fluid in space 56 which is opposed by lower pressure in the space 58 between the core element 20 and the ring 28, and by still lower pressure in the space between the turbine and guide discs 16a and 24a. Consequently, to achieve even an approximate balance the seal 52 has to be at relatively great radius and other considerations may make it impractical to so locate the seal as to achieve good balance.

In the construction of Fig. 6, better balance of the guide member is possible for the reason that the moderate pressures from spaces 58 and 60 are in this case opposed by the moderate pressure in the space 62 between the guide disc 24a and the turbine extension 48. In this connection it must be borne in mind that the relation of the pressures in different portions of the circuit is not a static factor, since the pressure difference between the radially outer and radially inner portions of the circuit will vary materially with variations in the speed ratio $n_2/n_1$. Consequently, the objective so far as balancing is concerned is to provide a construction in which the difference in values of the unbalanced thrust on a given member under the two most widely differing conditions is held to a minimum.

In addition to the better balancing possible with this construction and better sealing arrangements favorably influencing the hydraulic characteristics, the construction results in a further improvement in hydraulic performance by reducing the so called ventilation losses. These losses are the result of the internal friction of fluid trapped between relatively moving surfaces and increases as the cube of the relative speed between the surfaces. In the construction of Fig. 1 the fluid in space 56, between the guide and the rotating casing, which is always the fastest turning member of the apparatus, is productive of relatively high ventilation losses at all times. The ventilation losses from the fluid in spaces 58 and 60 are variable since these are dependent upon the speed of the turbine member relative to the guide, and this relative speed will vary between zero at stall to a maximum at the shift point, the maximum however never being as great as that between the guide and the casing. In the construction of Fig. 6 on the other hand, the fluid in space 56 is between the casing and the turbine member and the average relative speed between these parts is much less than the high speed differential existing at all times between the guide and the casing. Consequently, ventilation loss is reduced. While the addition of the extension 48 adds loss producing area, such additional loss is a direct function of the area while the loss reduction due to the resultant lower relative speeds is a third power function, so that there is material net gain.

As previously noted, the form of circuit characteristic of one phase of the invention is not limited to cases in which the guide and turbine blades are in a straight radial inflow section and the impeller in an inclined outflow section, but may equally well be applied to constructions in which the opposite is true. In Fig. 7 such a construction is illustrated, the other general features being as shown in Fig. 6 and corresponding parts having like reference characters. The choice of the form shown in Fig. 6 or Fig. 7 will be dictated largely by manufacturing considerations and the methods employed in fabricating the blading, as for example by casting or by assembly of separate parts. In cases where a standard guide and turbine blade system may be used in converters adapted to be employed with different engines requiring different empellers, the form of Fig. 7 may be preferable since the impellers are usually cast and for such procedure the straight radial impeller design may be advantageous. Also, for engine applications where the casing is directly connected to the crankshaft and in effect forms the engine flywheel and where space considerations are important, the form of Fig. 7 makes possible a shorter overall axial length at the outer diameter of the converter.

For certain special applications it may be desirable to provide a converter in which the rotating casing constitutes the secondary or turbine member rather than the primary or impeller member. The principles of the invention are applicable to such constructions and one suitable example is shown in Fig. 8, wherein parts corresponding to the parts of the previously described examples are correspondingly designated.

In the present construction, the rotatable casing 10 has fixed to it the first stage turbine blades 22 which carry the core element 20 that in turn supports the second stage turbine blades 18. A curved disc-like extension 64 extending inwardly from blades 18 forms the portion of the wall of the circuit cavity corresponding to that provided by the disc portion 16a of the secondary member of Fig. 1. The primary member is in the form of a rotatably mounted shaft 66 carrying an impeller disc 68 to which are fixed the impeller blades 12, which in turn support the core element 14. As in the previous embodiments, the member 24 carries the guide blades 26 located between the two turbine stages. While in this example the impeller blades have been shown in an inclined outflow section as in the construction of Figs. 1 and 6, it will be evident that they may be in the straight radial section as in the case of the construction shown in Fig. 7.

Certain features of the circuit and of the guide and turbine blading, disclosed herein and which are usable in other constructions, are disclosed and form per se the claimed subject matter of my copending application Serial No. 149,776 filed concurrently herewith and issued concurrently herewith.

From the foregoing it will be evident that many variations in the specific designs shown herein by way of example may be made without departing from the principles of the invention, that the several features may be combined in different ways and that in some instances certain of the features may be used to the exclusion of others while still obtaining improved results.

By way of specific examples, however, and as an indication of the results obtainable by use of the invention, it may be stated that I have constructed and tested a converter of the kind shown in Fig. 6 for use with a gasoline engine developing 130 H. P. at 3400 R. P. M., the size, power transmitting capacity and principal blade characteristics hereinbefore discussed being as follows:

The diameter of the circuit is 12.5 inches, with the blading layout designed to absorb 190 foot pounds of engine torque at shift point and 3400 R. P. M. engine speed. The blade profile and layout are substantially as shown in Figs. 3 to 5, the principal characteristics being as follows:

| Blade | α | φ | r/w |
|---|---|---|---|
| | Degrees | Degrees | |
| 1st turbine stage | 26 | 64 | .100 |
| Guide | 35 | 39 | .150 |
| 2nd turbine stage | 48 | 58 | .090 |

With this design the stall torque ratio is 4.2, the peak efficiency 85% and the ratio $n_2/n_1$ at shift point 0.75. From these figures it will be seen that not only is the peak efficiency at an acceptably high value but that the efficiency curve is quite flat over a very considerable range as evidenced by the high values of the stall torque ratio and the shift point.

In view of the various changes that may be made in specific designs in order to meet particular performance specifications and to provide torque absorbing characteristics suitable for different engines, the invention is to be understood as not limited to the examples of construction herein disclosed but to include all apparatus falling within the scope of the appended claims.

What is claimed is:

1. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said cavity and said core each being shaped so that said working sections of the circuit converge in radially outward direction and the neutral axes of the axial cross sections of the cavity and of the core both incline in the same direction with respect to a plane normal to the axis of rotation of the converter.

2. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuits, said cavity and said core each being shaped so that said working sections of the circuit converge in radially outward direction and the neutral axes of the sections of the cavity and of the core both incline in the same direction with respect to a plane normal to the axis of rotation of the converter, the angle of inclination of the neutral axis of the core being greater than the angle of inclination of the neutral axis of the cavity.

3. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuits, said cavity and said core each being shaped so that said working sections of the circuit converge in radially outward direction, said return bend sections each providing free flow areas first of increasing area and then of decreasing area, considered in the direction of flow of the working fluid, and the neutral axes of the axial cross sections of the cavity and of the core both inclining in the same direction with respect to a plane normal to the axes of rotation.

4. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said cavity and said core each being shaped so that one of said working sections of the circuit is substantially radial and the other of the working sections of the circuit converges in radially outward direction toward said radial section.

5. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow of the circuit, said cavity and said core each being shaped so that said inflow section of the circuit is radial and said outflow section is inclined in radially outward direction towards said inflow section.

6. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said turbine blades and said guide blades having profiles providing bluntly rounded inlet edge portions and value of the ratio of the radius of curvature of the inlet edge portions of the blades in profile to the width of the blades from the inlet edges to the outlet edges thereof in the case of the guide blades being greater than in the case of the turbine blades, said cavity and said core each being shaped so that said working sections of the circuit converge in radially outward direction and the neutral axes of the axial cross sections of the cavity and of the core both incline in the same direction with respect to a plane normal to the axis of rotation of the converter.

7. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said turbine blades and said guide blades having profiles comprising bluntly rounded inlet edge portions and remaining portions providing curved flow channels between adjacent blades in the same row for deflecting the fluid flowing therethrough, said channels being of contracting flow area in the direction of fluid flow therethrough and the angle of deflection of the channels in said guide blade row being less than the comparable angle in said turbine blade rows, said cavity and said core each being shaped so that said working sections of the circuit converge in radially outward direction and the neutral axes of the axial cross sections of the cavity and of the core both incline in the same direction with respect to a plane normal to the axis of rotation of the converter.

8. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially inner return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said turbine blades and said guide blades having profiles with bluntly rounded edge inlet portions and remaining portions providing curved flow channels between adjacent blades in the same row for deflecting the fluid therethrough, said channels being of contracting flow area in the direction of fluid flow therethrough, the angle of deflection of the channels in said guide blade ring being within the range between approximately 25° and approximately 50°, the angle of deflection of the channels in the first turbine stage being within the range between approximately 50° and approximately 90° and the angle of deflection of the channels in the second turbine stage being within the range between approximately 40° to approximately 65°, said cavity and said core each being shaped so that said working sections of the circuit converge in radially outward direction and the neutral axes of the axial cross sections of the cavity and of the core both incline in the same direction with respect to a plane normal to the axis of rotation of the converter.

9. A hydrodynamic torque converter of the rotating casing type providing a closed circuit for circulation of working fluid defined by a toroidal cavity having an annular core located therein, said circuit having two working sections one of which comprises an outflow section and the other of which comprises an inflow section, a radially outer return bend section and a radially inner return bend section, impeller blades carried by said rotating casing and located in said outflow section, a turbine member carrying at least two rows of turbine blades located in said inflow section and a reaction member carrying a row of guide blades disposed in said inflow section between said rows of turbine blades, each of said return bend sections providing unobstructed passages for free flow of working fluid between the inflow and outflow sections of the circuit, said turbine blades and said guide blades having profiles with bluntly rounded inlet edge portions and remaining portions providing curved flow channels between adjacent blades in the same row for deflecting the fluid flowing therethrough, said channels being of contracting flow area in the direction of fluid flow therethrough, the angle of deflection of the channels in said guide blade row being less than the comparable angle in said turbine blade rows and the value of the ratio of the radius of curvature of the inlet edge portions of the blades in profile to the width of the blades from the inlet edges to the outer edges thereof in the case of the guide blades being greater than in the case of the turbine blades, said cavity and said core each being shaped so that said working sections of the circuit converge in radially outward direction and the neutral axes of the axial cross sections of the cavity and of the core both incline in the same direction with respect to a plane normal to the axis of rotation of the converter.

10. A two stage hydrodynamic torque converter of the rotating casing type providing a closed circuit for circulation of working fluid defined by a toroidal cavity having an annular core located therein, said cavity and said core each being generally pear shaped in axial cross section, to provide a closed working circuit which in axial cross section comprises a substantially radial inflow section, an outflow section inclined in radially outward direction toward said inflow section and return bend sections connecting said inflow and outflow sections, impeller blades carried by said rotating casing and located in said outflow section, a turbine member carrying two stages of turbine blades located in radially spaced relation in said inflow section, and a reaction member carrying a row of guide blades disposed in said inflow section radially between said stages of turbine blades, said return bend sections providing free and unobstructed paths for flow of working fluid between said inflow and outflow sections.

11. A converter as defined in claim 10 in which said turbine member comprises axially spaced and generally radially extending disc like parts both situated axially between said turbine blades and the adjacent wall of said casing and said reaction member comprises a generally radially extending disc like part situated between said disc like parts of the turbine member.

12. A hydrodynamic torque converter of the rotating casing type providing a closed circuit comprising an outflow section and an inflow section formed within a toroidal cavity having an annular core located therein, impeller means for circulating working fluid in said circuit, a reaction member having a wheel portion carrying a ring of reaction guide blades located in said inflow section, a rotatably mounted turbine member having a wheel portion carrying a ring of turbine blades located in said inflow section and discharging to said guide blades, said turbine member further having a balancing portion located axially between the wheel portion of the reaction member and the adjacent wall of the casing, said balancing portion extending inwardly from the outer part of said turbine member to a relatively small inner diameter and sealing means at the radially inner part of said balancing portion for substantially closing communication at said inner diameter between the fluid spaces at the axially opposite sides of said balancing portion.

13. A converter as defined in claim 12 in which the wheel portion of the turbine member includes an annular core member connecting the aforementioned ring of turbine blades with a second ring of turbine blades located in the inflow section of the circuit and in which a seal is provided at the inner diameter of the core between said core member and a cooperating core member rotationally fixed with respect to the casing.

References Cited in the file of this patent

UNITED STATES PATENTS

| Number | Name | Date |
|---|---|---|
| 1,583,735 | Nydquist | May 4, 1926 |
| 2,102,635 | Lysholm et al. | Dec. 21, 1937 |
| 2,255,430 | Lysholm et al. | Sept. 9, 1941 |
| 2,292,384 | Lysholm | Aug. 11, 1942 |
| 2,376,462 | Teagno | May 22, 1945 |
| 2,387,398 | Hruska et al. | Oct. 23, 1945 |
| 2,388,112 | Black et al. | Oct. 30, 1945 |
| 2,418,362 | Miller | Apr. 1, 1947 |
| 2,529,929 | Foster | Nov. 14, 1950 |
| 2,585,309 | Gregg | Feb. 12, 1952 |

FOREIGN PATENTS

| Number | Country | Date |
|---|---|---|
| 423,347 | Great Britain | Jan. 30, 1935 |
| 504,914 | Great Britain | May 1, 1939 |